United States Patent [19]

Marcu

[11] Patent Number: 5,482,308
[45] Date of Patent: Jan. 9, 1996

[54] FIFTH WHEEL BEARING PLATE IMPROVEMENTS

[76] Inventor: Mihail I. Marcu, 43 Renata Ct., Dundas, Ontario, Canada, L9H 6X2

[21] Appl. No.: 266,717

[22] Filed: Jun. 28, 1994

[51] Int. Cl.⁶ ............................. B62D 53/08; F16C 17/04
[52] U.S. Cl. ........................................ 280/433; 384/421
[58] Field of Search ............................ 280/433, 441.1, 280/416; 384/421, 420

[56] References Cited

U.S. PATENT DOCUMENTS

| | | | |
|---|---|---|---|
| 3,174,812 | 3/1965 | Widmer | 384/421 |
| 3,704,924 | 12/1972 | Lowry | 280/433 X |
| 3,924,909 | 12/1975 | Kent et al. | 384/421 |
| 4,542,912 | 9/1985 | St. Louis | 280/433 |
| 4,752,081 | 6/1988 | Reeners et al. | 280/433 |
| 5,165,714 | 11/1992 | Kaim | 280/433 |
| 5,263,856 | 11/1993 | Huehn et al. | 280/433 X |

FOREIGN PATENT DOCUMENTS

| | | | |
|---|---|---|---|
| 2200334 | 8/1988 | United Kingdom | 280/433 |
| 9300248 | 1/1993 | WIPO | 280/433 |

*Primary Examiner*—Kevin T. Hurley

[57] ABSTRACT

A fifth wheel bearing plate assembly is proposed where a recess is made in the original standard fifth wheel bearing plate, an antifriction plastic liner is placed in this recess, the liner being secured in working position by retaining ears and trapezoidal retaining blocks, the retaining ears not affecting the operation of the fifth wheel, the liner being raised in reference with the original surface of the fifth wheel bearing plate.

1 Claim, 4 Drawing Sheets

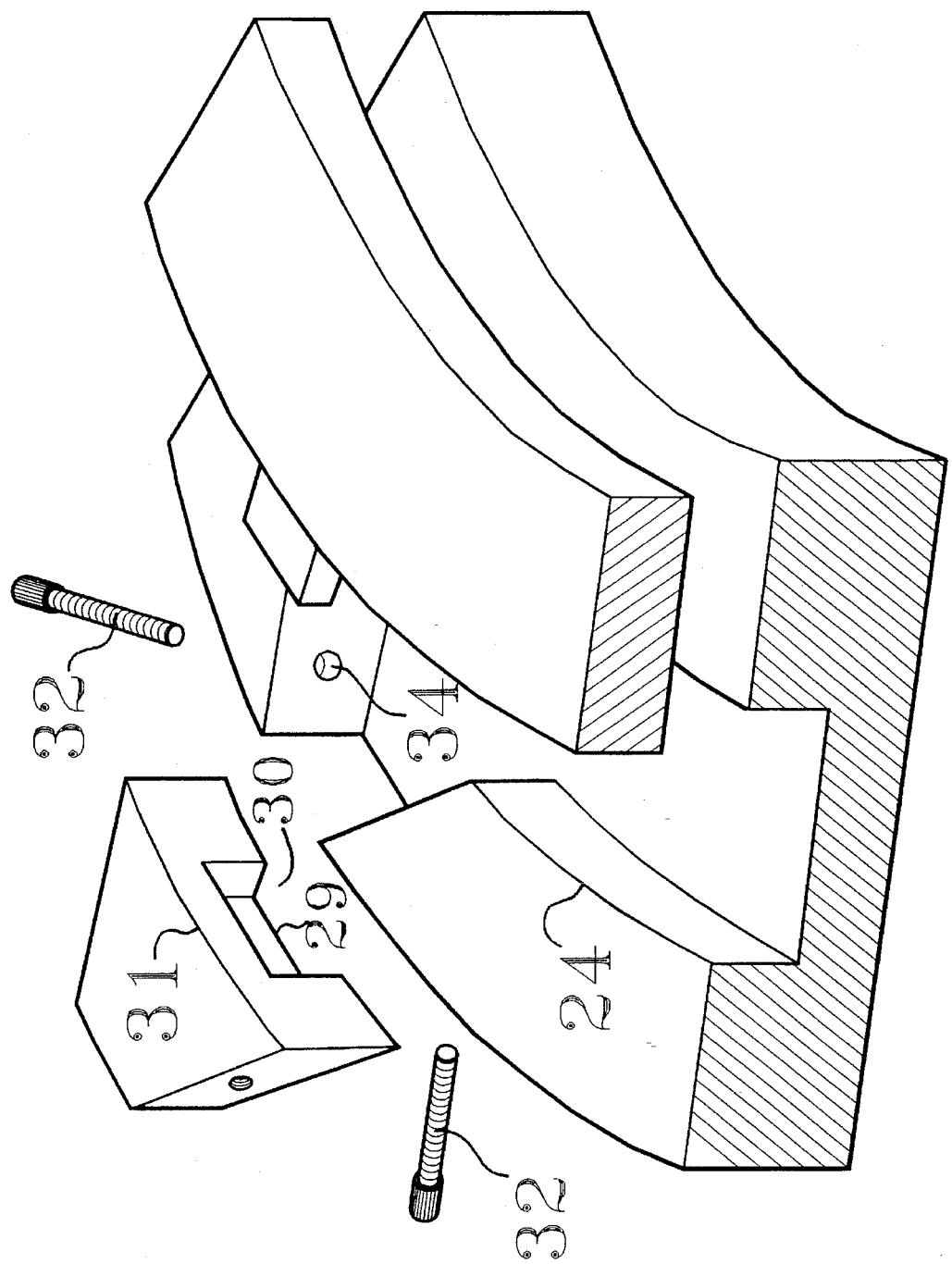

FIFTH WHEEL BEARING PLATE IMPROVEMENTS

BACKGROUND OF THE INVENTION

The invention relates to the fifth wheel bearing plate improvements, and more particularly to fifth wheels with an antifriction plastic liner.

There are now in operation hundred of millions of trucks going back and forth all over the world doing over 75% of the material land transportation, the rest of 25% being covered by the rail, aircraft and other systems.

The fifth wheel is using grease at a rate of about 1 kg per 3 months depending on conditions. This grease is in danger to be contaminated with dirt, dust, and other particulate contaminants normally associated with travelling long distances sometimes in areas with much dust and sand. Consequently this grease is becoming an abrasive paste, and because of the special additives for pressure and water repellency, this paste is glued to the bearing surfaces of the fifth wheel, as well as on the surrounding areas.

When the time is coming to clean it is necessary to use high pressure steam, and the regreasing operation is per se complicated and time consuming.

A serious effect is the environmental pollution by which millions of tonnes of used grease is discharged in the environment or in the treatment facilities at the truck maintenance centres around the world.

STATE OF THE ART

Different efforts were made to eliminate the above disadvantages, based on the idea of using a plastic liner to replace the grease. All these solutions used screws associated directly with the bearing surfaces, or welds, or adhesives, all in direct association with the bearing surfaces, that is applied directly to them. This creates a lot of difficulties in terms of damaging the liner or creating problems when the liner is worn—being necessary to be burned by flame, by this affecting the heat treatment of the fifth wheel, or when is worn there is a danger that the screws will stick out through the liner and will damage the bolster plate.

THE PRINCIPLE OF THE INVENTION

The above disadvantages were eliminated by the present invention by the fact that:

it proposes a fifth wheel comprising:

a) a fifth wheel bearing plate, b) whereby the fifth wheel bearing plate has a recess in it, this recess having a certain constant depth herein after called the recess depth, this recess depth in fact having the bottom flat and the edges being parallel with the edges of the fifth wheel bearing plate along the left and right arms of the fifth wheel bearing plate, but at the engaging ramps the edges of the recess being straight and essentially perpendicular on the general engaging direction, c) whereby the walls of the recess being, except the engaging areas, vertical and perpendicular on the flat bottom, c1) whereby the form of the recess in the engaging ramps areas being such that the, walls of the recess are inclined in reference with the flat bottom of the recess, therefore making angled dead ends retaining areas, d) whereby on the margins of the fifth wheel bearing plate, left and right above the centre of the fifth wheel in the direction of the engagement, there are at least two cuts, communicating the recess space with the outside space of the fifth wheel, e) whereby these cuts, having the bottom like a continuation of the flat bottom of the recess, and whereby these cuts having a trapezoidal form, that is these cuts having the form of opening in the defending walls of the medieval castles, the area at the recess being larger than the area at the exterior of the fifth wheel, f) also the proposed fifth wheel contains an antifriction plastic liner made of PTFE, high impact bearing nylon with solid lubricant in it, or other suitable plastic antifriction material, this plastic liner having the general form of the said recess in the fifth wheel bearing plate, so that if it is put inside of the recess, will fit snugly in to it, however having a play/gap in all directions to take care of the thermal expansion of the plastic liner, having in mind that the plastic is expanding/contracting cca 9 times more than steel,the said play/gap being in the range of cca 3 mm all around the recess contour, the liner having a flat configuration and at the ends/the engaging area being chisel like slanted ends to accommodate the inclined walls of the recess, g) whereby the thickness of the antifriction plastic liner being bigger than the depth of the recess, h) whereby in the areas associated with the cuts, the liner having rectangular protuberances, or rectangular retaining ears protruding outside of the liner, their bottom surfaces coinciding, being a continuation of the bottom surface of the liner, their thickness being smaller than the thickness of the liner, so that an observer looking to them will note them as some rectangles attached to the liner, i) whereby, when the liner is put inside of the recess, the said rectangular retaining ears will be centred in relation with the walls of the cuts, j) also the proposed fifth wheel containing trapezoidal retaining blocks, these blocks, having the form of an extruded trapezoid or trapezoidal configuration, and being able to fit in the said cuts, having the larger area flush at the inside of the fifth wheel bearing plate, and the exterior flush with the outside surface of the fifth wheel bearing plate, also the top area of the retaining blocks being flush with the top surface of the fifth wheel bearing plate, k) whereby when in place or working position, the trapezoidal retaining blocks will recreate the continuation of the recess wall and the surfaces of the fifth wheel bearing plate in the cuts areas,so that when in place, around and at the top the fifth wheel bearing surface is continuous, l) whereby the trapezoidal retaining blocks nave at the larger area a rectangular inner retaining recess having the bottom part open ended and the top part like a roof, this rectangular retaining recess being centred in reference with the axis of symmetry of the trapezoidal configuration, and having the dimensions and configuration essentially the same with the said rectangular retaining ears of the plastic antifriction liner, m) whereby the rectangular retaining ears, can be accommodated in the said rectangular retaining recesses, n) whereby the trapezoidal retaining blocks are retained in working position by screws rigidizing the retaining blocks with the fifth wheel bearing plate, the symmetry axes of these screws being parallel with the upper surface of the fifth wheel bearing plate, and the screws being applied from the exterior of the fifth wheel bearing plate, the retaining blocks having suitable threaded holes where the screws can be applied, and the fifth wheel has suitable holes and recesses to allow the screws to be accommodated, o) whereby the screws have no prominent protuberances outside of the fifth wheel bearing area, so that when assembled the fifth wheel is essentially a smooth object, THE way of operation/putting together of the above proposed fifth wheel is as follows:

The chisel like slanted ends of the antifriction liner are placed in the angled dead end retaining areas, then the liner is gently placed in the recess of the fifth wheel bearing plate, by this the rectangular retaining ears are coming centred in the trapezoidal cuts, then the trapezoidal retaining blocks and the screws are applied, the antifriction liner upper surface being a little above the surface of the fifth wheel bearing plate, and having a little play/gap around the inner and exterior periphery.

DESCRIPTION OF THE DRAWINGS

Below is given an example of application of the invention in relation but not limited with the figures:

FIG. 5—Perspective view detail trapezoidal retailing block seen from inside the fifth wheel.

DETAILED DESCRIPTION OF THE PREFERRED EMBODIMENT

Figure 1:
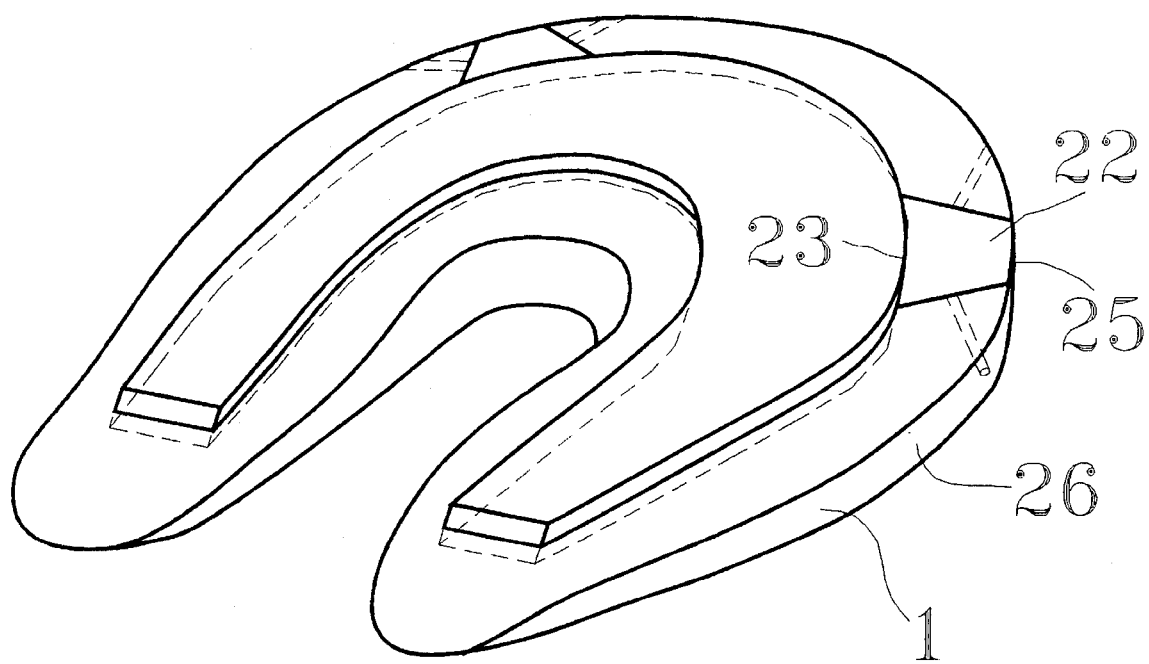
FIG. 1—Perspective view fifth wheel bearing plate assembled.
Figure 2:
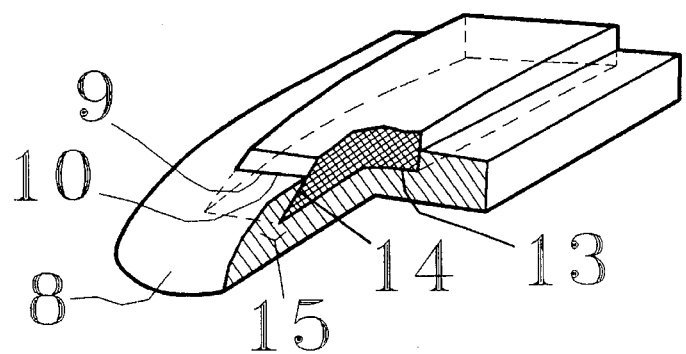
FIG. 2—Perspective view—the chisel like slanted ends of the antifriction liner.
Figure 3:
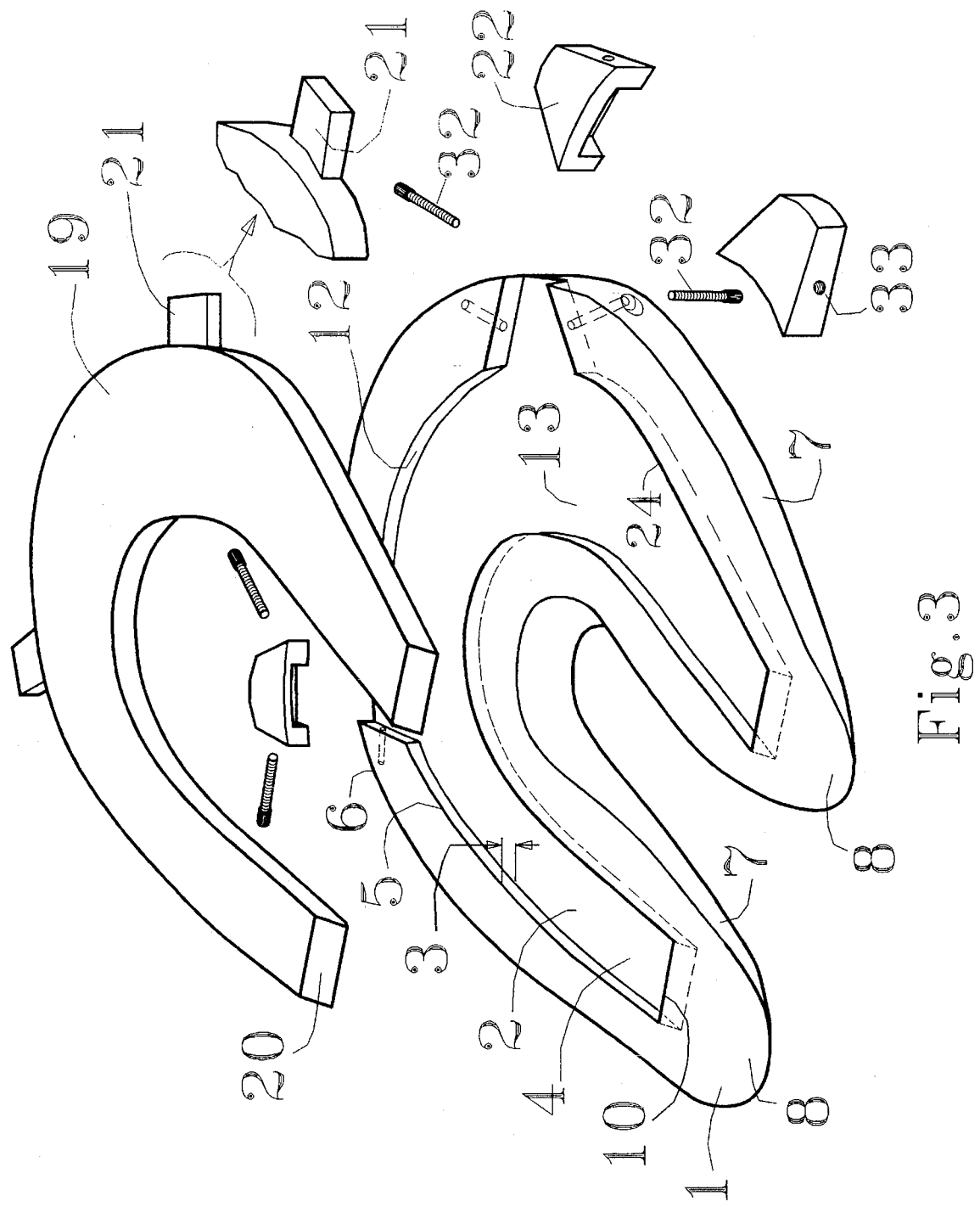
FIG. 3—Exploded view of the fifth wheel bearing plate assembly.
Figure 4:
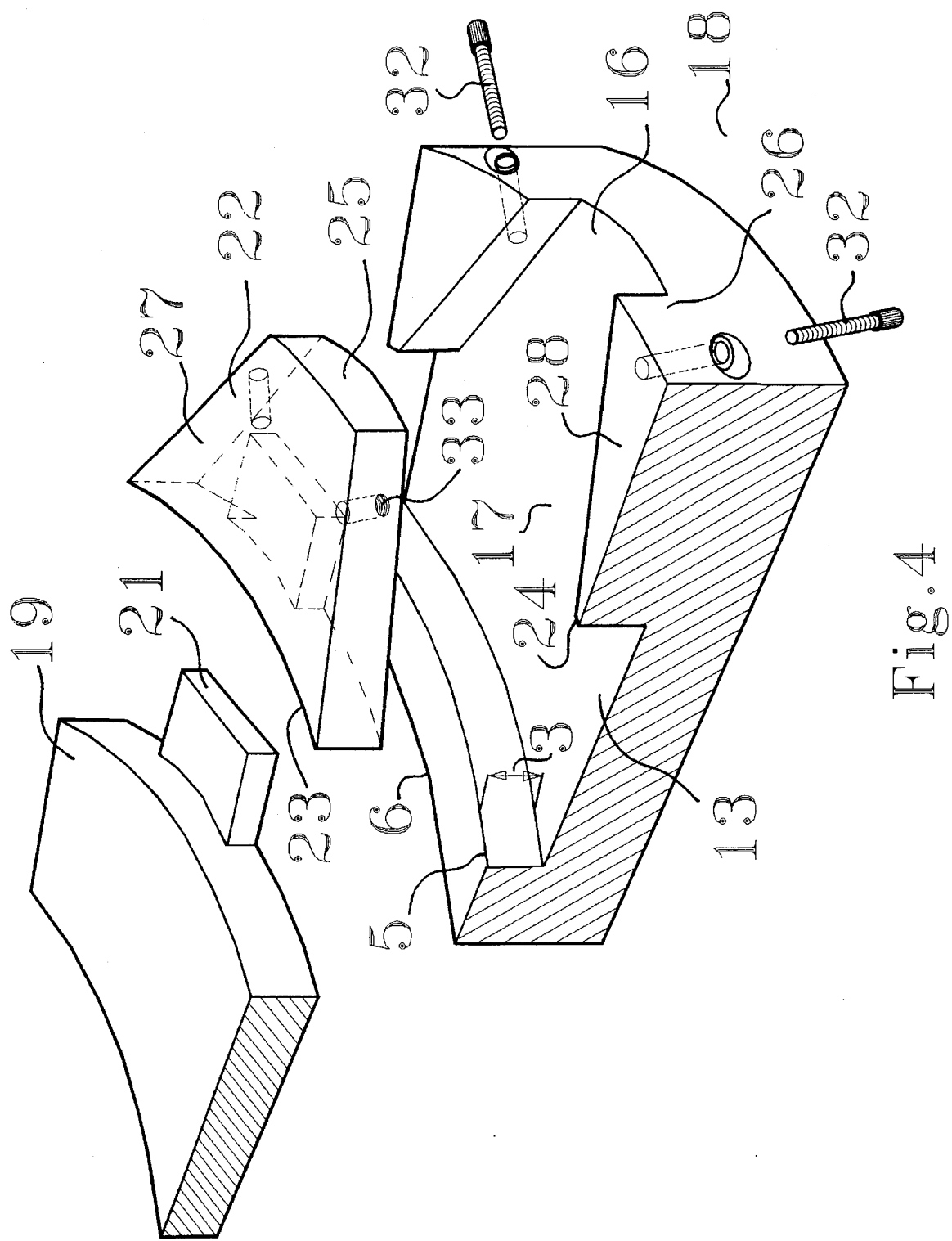
FIG. 4—Perspective view detail trapezoidal retaining block seen from outside fifth wheel.

As is seen in the figures, the proposed fifth wheel comprises:

a) a fifth wheel bearing plate 1, b) whereby the fifth wheel bearing plate has a recess in it 2, this recess having a certain constant depth 3 herein after called the recess depth, this recess depth in fact having the bottom 4 flat and the edges 5 being parallel with the edges 6 of the fifth wheel bearing plate 1 along the left and right arms 7 of the fifth wheel bearing plate, but at the engaging ramps 8 the edges 9 of the recess being straight 10 and essentially perpendicular on the general engaging direction, c) whereby the walls of the recess 12 being, except the engaging areas, vertical and perpendicular on the flat bottom 13, c1) whereby the form of the recess in the engaging ramps areas being such that the, walls of the recess are inclined 14 in reference with the flat bottom of the recess, therefore making angled dead ends retaining areas 15, d) whereby on the margins of the fifth wheel bearing plate, left and right above the centre of the fifth wheel in the direction of the engagement, there are at least two cuts 16, communicating the recess space 17 with the outside space 18 of the fifth wheel, e) whereby these cuts, having the bottom like a continuation of the flat bottom of the recess, and whereby these cuts having a trapezoidal form, that is these cuts having the form of opening in the defending walls of the medieval castles, the area at the recess being larger than the area at the exterior of the fifth wheel, f) also the proposed fifth wheel contains an antifriction plastic liner 19 made of PTFE, HIGH impact bearing nylon with solid lubricant in it, or other suitable plastic antifriction material, this plastic liner having the general form of the said recess in the fifth wheel bearing plate, so that if it is put inside of the recess, will fit snugly in to it, however having a play/gap in all directions to take care of the thermal expansion of the plastic liner, having in mind that the plastic is expanding/contracting cca 9 times more than steel, the said play/gap being in the range of cca 3 mm all around the recess contour, the liner having a flat configuration and at the ends/the engaging area being chisel like slanted ends 20 to accommodate the inclined walls of the recess, g) whereby the thickness of the antifriction plastic liner being greater than the depth of the recess so that the liner is above the fifth wheel bearing surface, h) whereby in the areas associated with the cuts, the liner having rectangular protuberances 21, or rectangular retaining ears protruding outside of the liner, their bottom surfaces coinciding, being a continuation of the bottom surface of the liner, their thickness being smaller than the thickness of the liner, so that an observer looking to them will note them as some rectangles attached to the liner, i) whereby, when the liner is put inside of the recess, the said rectangular retaining ears will be centred in relation with the walls of the cuts, j) also the proposed fifth wheel containing trapezoidal retaining blocks 22, these blocks, having the form of an extruded trapezoid or trapezoidal configuration, and being able to fit in the said cuts, having the larger 23 area flush at the inside 24 of the fifth wheel bearing plate, and the exterior 25 flush with the outside surface 26 of the fifth wheel bearing plate, also the top area 27 of the retaining blocks being flush with the top surface 28 of the fifth wheel bearing plate, k) whereby when in place or working position, the trapezoidal retaining blocks will recreate the continuation of the recess wall and the surfaces of the fifth wheel bearing plate in the cuts areas, so that when in place, around and at the top the fifth wheel bearing surface is continuous, i) whereby the trapezoidal retaining blocks nave at the larger area a rectangular inner retaining recess 29 having the bottom part 30 open ended and the top part 31 like a roof, this rectangular retaining recess being centred in reference with the axis of symmetry of the trapezoidal configuration, and having the dimensions and configuration essentially the same with the said rectangular retaining ears 21 of the plastic antifriction liner, m) whereby the rectangular retaining ears, can be accommodated in the said rectangular retaining recesses, n) whereby the trapezoidal retaining blocks are retained in working position by screws 32 rigidifying the retaining blocks with the fifth wheel bearing plate, the symmetry axes of these screws being parallel with the upper surface of the fifth wheel bearing plate,and the screws being applied from the exterior of the fifth wheel bearing plate, the retaining blocks having suitable threaded holes 33 where the screws can be applied, and the fifth wheel has suitable holes 34 and recesses to allow the screws to be accommodated, o) whereby the screws have no prominent protuberances outside of the fifth wheel bearing area, so that when assembled the fifth wheel is essentially a smooth object,

THE WAY OF OPERATION OF THE PREFERRED EMBODIMENT

THE way of operation/putting together of the above proposed fifth wheel is as follows:

The chisel like slanted ends 20 of the antifriction liner 19 are placed in the angled dead end retaining areas 15, then the liner 19 is gently placed in the recess 2 of the fifth wheel bearing plate 1, by this the rectangular retaining ears 21 are coming centred in the trapezoidal cuts 16, then the trapezoidal retaining blocks 22 and the screws 32 are applied, the antifriction liner upper surface being a little above the surface of the fifth wheel bearing plate, and having a little play/gap around the inner and exterior periphery.

ADVANTAGES

The ADVANTAGES of applying this invention are:

1—eliminates the greasing problem,

2—reduces the wear of the fifth wheel,

3—easy to assemble, disassemble and maintain,

4—has a self locking effect because of the trapezoidal retaining blocks,

5—has no screws or other rigidifying means impending on the bearing surfaces,

6—is positively locked and allows expansion.

I claim:

1. An improved fifth wheel bearing plate comprising:

a fifth wheel bearing plate including left and right engaging ramps and a periphery, a recess located in the fifth wheel bearing plate, the recess having a constant recess depth, a plurality of cuts in said fifth wheel bearing plate, said cuts communicatins with said recess and the periphery of the fifth wheel bearing plate, the cuts being trapezoidal in shape, an antifriction plastic liner disposed in said recess and having a thickness greater than said recess depth, the antifriction plastic liner including a plurality of rectangular retaining ears protruding from an outside periphery thereof, said retaining ears protruding into said cuts in the fifth wheel bearing plate, a plurality of trapezoidal retaining blocks disposed in said cuts and overlying said retaining ears, and means for releasibly securing said retaining blocks in said cuts.

\* \* \* \* \*